United States Patent
Glowacki

[11] Patent Number: 5,222,692
[45] Date of Patent: Jun. 29, 1993

[54] SEALING ASSEMBLY BETWEEN AN AIRCRAFT FUSELAGE AND THE OUTER NOZZLE FLAPS OF A TURBOJET ENGINE MOUNTED IN THE REAR END OF THE FUSELAGE

[75] Inventor: Pierre A. Glowacki, Fontaine Le Port, France

[73] Assignee: Societe Nationale D'Etude Et De Construction De Moteurs D'Aviation "S.N.E.C.M.A.", Paris, France

[21] Appl. No.: 799,961

[22] Filed: Nov. 29, 1991

[30] Foreign Application Priority Data

Dec. 5, 1990 [FR] France .................. 90 15193

[51] Int. Cl.5 .................................. B64D 29/04
[52] U.S. Cl. .............................. 244/53 R; 244/129.1; 244/131
[58] Field of Search .......... 244/55, 53 R, 52, 110 B, 244/129.1, 131; 239/265.37, 265.39, 265.19

[56] References Cited

U.S. PATENT DOCUMENTS

| | | |
|---|---|---|
| 3,098,352 | 7/1963 | Taub et al. .............. 239/265.37 |
| 3,243,126 | 3/1966 | Kurti et al. .............. 239/265.39 |
| 3,441,221 | 4/1969 | Naud et al. .............. 239/265.39 |
| 3,658,253 | 4/1972 | Steffen .................... 239/265.39 |
| 4,022,948 | 5/1977 | Smith et al. .............. 239/265.39 |
| 4,114,248 | 9/1978 | Smith et al. . |
| 4,203,286 | 5/1980 | Warburton ............... 239/265.39 |

FOREIGN PATENT DOCUMENTS 1751550 12/1970 Fed. Rep. of Germany .
2244945 4/1975 France .

Primary Examiner—Galen Barefoot
Attorney, Agent, or Firm—Oblon, Spivak, McClelland, Maier & Neustadt

[57] ABSTRACT

An aircraft having a turbojet engine disposed within its fuselage wherein towards the rear end thereof it is provided with a sealing assembly between the rear end of the fuselage and the outer flaps of the nozzle of the turbojet engine, the sealing assembly including a central carrier ring, preferably made of a carbon-epoxy material, secured to the turbojet engine by supporting legs, a hollow front seal at the front end of the carrier ring engaging the inner surface of the fuselage, and a hollow rear seal at the rear end of the carrier ring engaging each of the outer flaps, the carrier ring also engaging the inner surface of the fuselage at a position spaced rearwardly from the front seal.

8 Claims, 3 Drawing Sheets

SEALING ASSEMBLY BETWEEN AN AIRCRAFT FUSELAGE AND THE OUTER NOZZLE FLAPS OF A TURBOJET ENGINE MOUNTED IN THE REAR END OF THE FUSELAGE

BACKGROUND OF THE INVENTION

1. Field of the Invention

The invention relates to jet propelled aircraft, such as certain types of military aircraft, in which the engine is incorporated directly into the fuselage of the aircraft. In this type of aircraft the rear nozzle of the turbojet engine is situated as a direct extension of the fuselage of the aircraft, and it is necessary to ensure a seal between the nozzle and the rear end of the fuselage.

By way of illustration, FIG. 1 of the drawings shows the rear end of a fighter aircraft 2 in which a turbojet engine 5 for propelling the aircraft is mounted in a housing 4 within the fuselage of the aircraft. The turbojet engine 5 is attached to the housing 4 at the front by pivot means 3 which allows the engine to pivot about a horizontal axis. During operation of the turbojet engine 5, the walls of the engine, as well as the equipment attached to its periphery, can reach temperatures between 250° and 350° C. in the case of military aircraft. It is therefore necessary to protect the aircraft structure at the front of the aircraft from these increases in temperature. To this end, cold air is drawn from the air intake of the aircraft and is led to the inlet of the housing 4 for removing the heat given off during running of the turbojet engine 5. The air current thus created flows inside the housing 4 through a tubular duct 7 formed between the housing 4 and the turbojet engine 5, and is discharged to the exterior of the aircraft at the position of the nozzle constituting the rear end of the aircraft.

This cooling of the engine compartment is therefore carried out by a flow which is the equivalent of two per cent of the flow through the engine itself. Although this cooling flow is low, incorrect discharge thereof can greatly disturb the operation of the thrust nozzle and the aerodynamic behavior of the rear of the aircraft. Accordingly, the cooling air is discharged at the nozzle between inner flaps 8 and outer flaps 9. The inner flaps 8 are arranged as an extension of the rear part of the body of the turbojet engine 5, that is to say the afterburner duct 6. The outer flaps 9 are arranged as an extension of the housing 4 in which the turbojet engine 5 is located, that is to say as an extension of the aircraft's fuselage. The inner flaps 8 are therefore in contact with the high temperature propulsive gases and, for this reason, are called "hot flaps". The outer flaps 9 are located on the outside of the cooling air stream emerging from the duct 7, and for this reason are called "cold flaps". The cooling air therefore emerges from the duct 7 between the inner flaps 8 and the outer flaps 9, providing thermal protection for the surrounding rear part of the aircraft.

A seal 10 is provided between the rear end of the fuselage and the outer flaps 9, which are mounted so as to pivot about axes fixed in relation to the turbojet engine 5. This seal is necessary, inter alia, to protect the aircraft structure from possible back surges of combustion gases upstream of the nozzle. The seal assembly used for this purpose must be flexible because radial and axial displacements on the turbojet engine 5 occur relative to the aircraft's fuselage. In fact, there can arise axial displacements of the order of 20 mm, due to differences in temperature and in the materials used. Radial displacements may be of the order of 10 mm, and occur mainly during maneuvers such as tight turns or arrested landings. In addition, it may be noted that the outer flaps can have a travel of 10°.

In FIG. 1, the seal 10 between the fuselage and the outer flaps is shown in heavy lines, and represents equally the known sealing assemblies of the prior art and that which is the subject of the present invention.

The purpose of FIG. 1 is only to indicate the position of this sealing assembly in a military aircraft.

2. Description of the Prior Art

One known form of such a sealing assembly is shown in FIG. 2 of the drawings.

This known seal comprises an annular, flexible, metal front part 11 having its front end 12 forming an inwardly curved flexible portion in contact with a slide shoe 13 fixed to the fuselage of the aircraft 2. This front part 11 is preferably formed by flexible strips of titanium riveted to support legs 19 which are themselves each fixed to the periphery of the afterburner duct 6 of the turbojet engine 5. The end 12 of this front part 11 is preferably made of teflon to facilitate axial sliding movement of the seal.

The seal further comprises an intermediate part 21 which is of metal and is located to the rear of the support legs 19. This intermediate part 21 carries shoes 16, preferably of teflon, which contact the rear end 15 of the fuselage of the aircraft 2, thus permitting the entirety of the turbojet engine 5 to slide axially relative to the inner wall of the fuselage.

The seal is completed by a metal rear part 17 which is divided by longitudinal slits, each divided portion being in contact with the base of an outer flap 9.

The fact that this seal assembly consists of several split parts, which themselves are composed of several flexible parts, enables radial displacements due to distortion of the different parts of the seal to be accommodated.

The number of parts constituting such a seal is in the neighborhood of 250 parts, including rings, strips, bolts, rivets, of which a large number are made of titanium, and slider pads made of teflon. The assembly and mounting of such a seal is therefore complicated and its production cost is high. In addition, the large number of parts makes its weight far from negligible.

SUMMARY OF THE INVENTION

With the aim of ovecoming these disadvantages in an aircraft including a fuselage, a turbojet engine disposed within said fuselage towards the rear end thereof, said engine having an afterburner duct and a nozzle including outer flaps adjacent said rear end of said fuselage, a sealing assembly between said rear end of said fuselage and said outer flaps of said nozzle, and support legs attaching said sealing assembly to said afterburner duct, according to the invention the sealing assembly comprises a carrier ring to which said support legs are fixed, said carrier ring having front and rear ends, a hollow front seal located at said front end of said carrier ring and engaging the inner surface of said fuselage at said rear end thereof at a first contact zone, said carrier ring also engaging said inner surface of said fuselage at said rear end thereof by simple frictional contact at a second contact zone separate from said first contact zone, and a hollow rear seal located at said rear end of said carrier ring and engaging said outer flaps at a third contact zone.

To provide such an assembly with satisfactory elastic properties, the carrier ring is preferably made of a composite material and is substantially cylindrical. The preferred composite material for the carrier ring is a carbon epoxy material or a material of the carbon-bismaleimide type.

The front seal is preferably made of silicone, and may be inflatable and retractable.

The rear seal is preferably provided with lips or is an extra flat inflatable seal.

In order to adapt itself easily to each outer flap, the rear seal is preferably divided up into the same number of parts as there are outer flaps, each separate part contacting a respective outer flap.

Further preferred features of the invention will become apparent from the following description of the preferred embodiment with reference to FIG. 3 of the drawings.

BRIEF DESCRIPTION OF THE DRAWINGS

As already described.

DESCRIPTION OF THE PREFERRED EMBODIMENT

Figure 1:
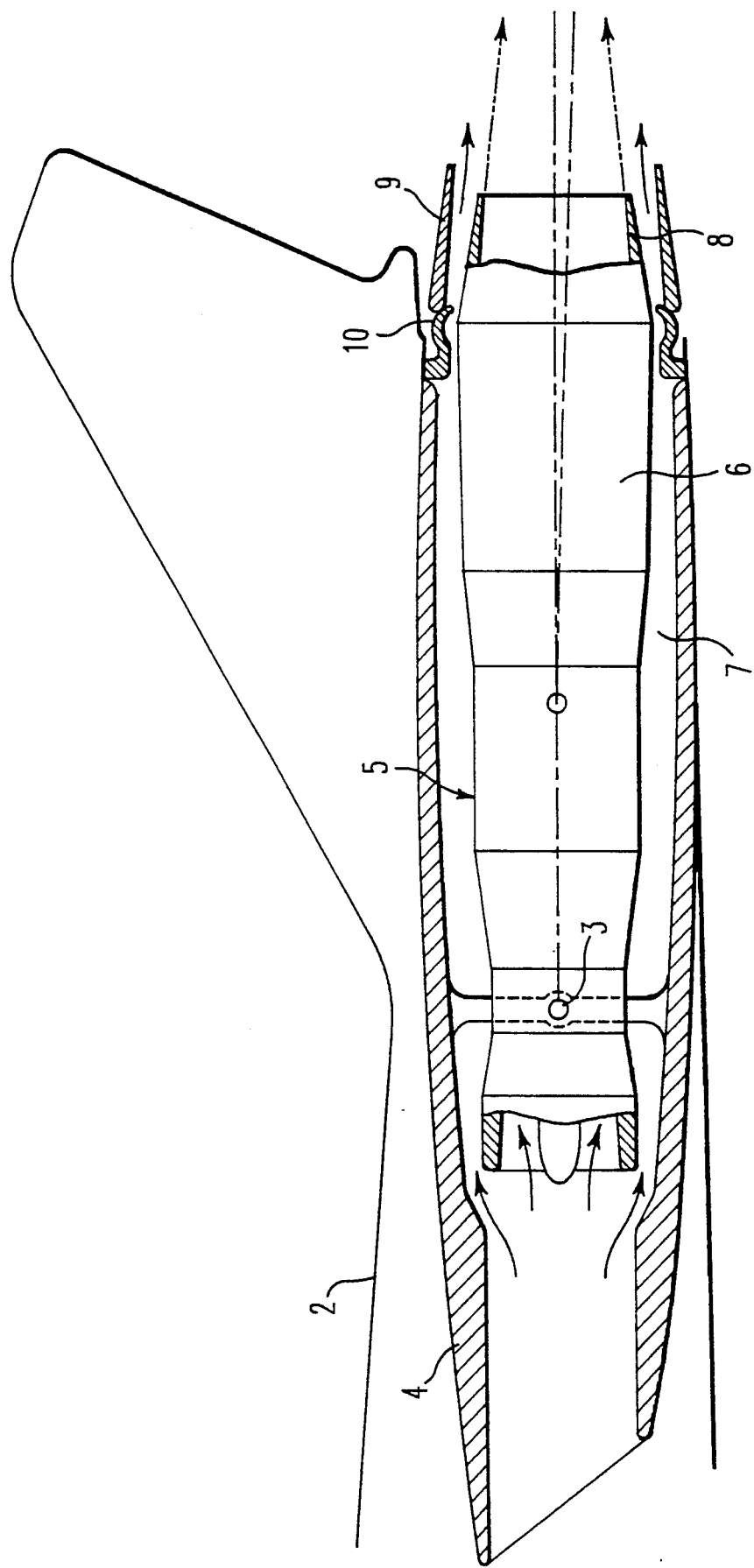
FIG. 1 is a diagram of the rear end of a military aircraft illustrating the position of the sealing assembly in accordance with the invention.
Figure 2:
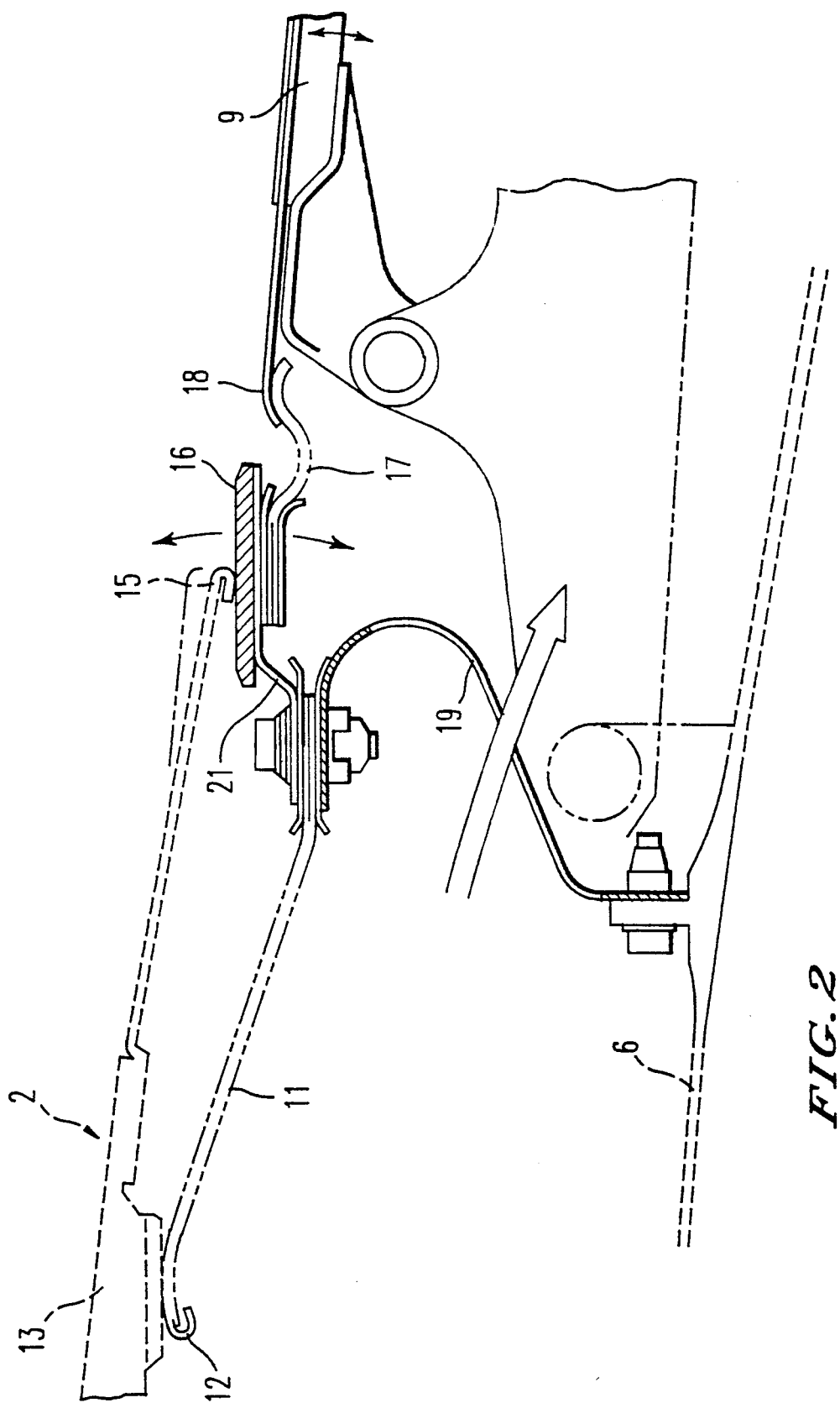
FIG. 2 is a diagram illustrating the construction of one known form of the sealing assembly.
Figure 3:
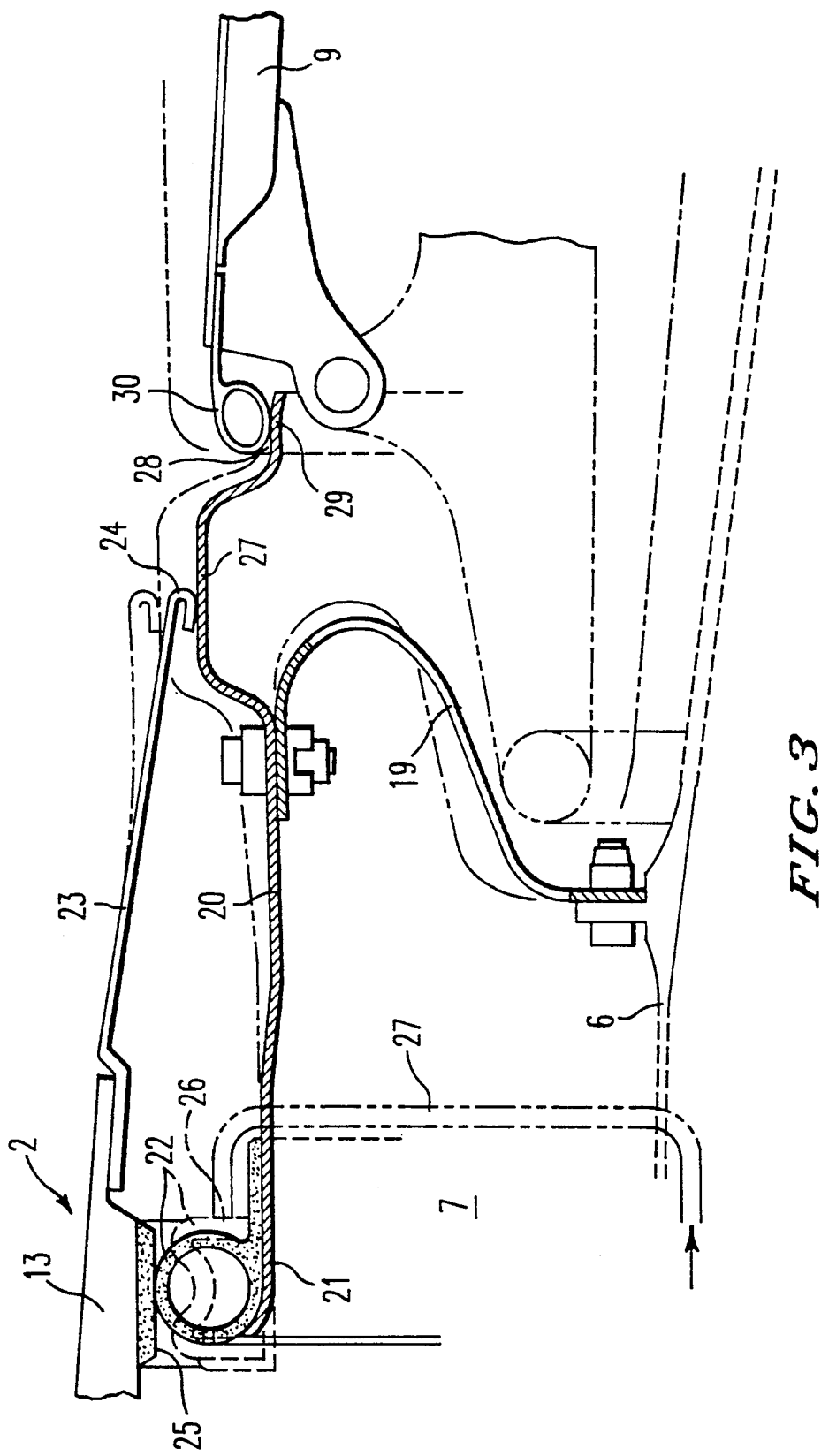
FIG. 3 is a diagram similar to FIG. 2, but showing the construction of a preferred embodiment of the sealing assembly in accordance with the invention.

FIG. 3 represents the sealing assembly of the preferred embodiment in the same position and adapted to the same elements as the prior art assembly represented in FIG. 2. The assembly therefore also ensures a seal between the rear end of the fuselage of the aircraft, extended by bridging strips 23, and the outer flaps 9 attached to the turbojet engine of the aircraft.

The assembly in accordance with the invention consists principally of a carrier ring 20, a front seal 22, and a rear seal 30.

The carrier ring 20 is fixed at its center to supporting legs 19 which are similar to those which support the prior art seal as described with reference to FIG. 2. To confer sufficient flexibility to the sealing assembly, the carrier ring 20 is preferably made of composite material, a carbon epoxy material or a material of the carbon-bismaleimide type being preferred depending on the ambient temperature. To ensure the rigidity of the assembly, the shape of the carrier ring is substantially cylindrical, its axis of revolution being coincident with the axis of the turbojet engine.

The front seal 22 is located at the front end 21 of the carrier ring 20 where it is attached, for example, by bonding. The front seal 22 is hollow and its shape preferably resembles that of a musical note, the stem of this note being bonded to the front end 21 of the carrier ring 20. Such a seal may be made of silicone reinforced with a woven metallic mesh. The diameter of the front seal 22 is chosen so that this seal can be squashed against the inner surface of the fuselage, within the limits of the possible radial displacements of the turbojet engine relative to the fuselage of the aircraft 2. It may also slide axially on the slide shoe 13 on the inside of the fuselage, which shoe is preferably formed by a ring of teflon 25.

The representation of the seal 22 shown in chain-dotted lines is a variant of the embodiment that provides for the front seal 22 to be inflatable and therefore retractable. Such a seal can be obtained commercially from DUNLOP under the name "High expansion inflatable seal". It comprises at least one air inlet 26 to which is fitted a flexible hose 27 connected to an enclosure which is at a higher pressure than that existing in the space 7 between the aircraft fuselage and the afterburner duct 6. More precisely, this air is drawn from between the heat shielding and the afterburner duct of the turbojet engine. When the turbojet engine is shut down, atmospheric pressure will exist in the space 7 between the fuselage of the aircraft and the turbojet engine, and the front seal 22 returns to its initial shape, which may be that represented in chain-dotted lines in FIG. 3. The front seal 22 is then no longer in contact with the teflon ring 25 of the slider shoe 13, and removal of the seal assembly is thus made easier.

The rear seal 30 of the assembly is also hollow, and is located at the rear of the assembly. It ensures a seal between the carrier ring 20 of the assembly and the outer flaps 9. The rear seal 30 may be either fixed to the carrier ring 20 or, as represented in FIG. 3, fixed to the outer flaps 9. In this case, it may be bonded to the outer flaps 9 after it has been placed in position. Like the front seal 22, the rear seal 30 is an annular seal, but in contrast is divided into a number N of segments equal to the number of the outer flaps 9. Each segment is in contact with a respective one of the flaps 9. The whole of the rear seal 30 may be a simple lip seal, but alternatively it may be formed by an inflatable seal, preferably an extra flat one. The rear seal 30 is contacted by the outer surface 28 of the carrier ring 20 at its rear end 29.

The outer surface 28 of the carrier ring 20 also contacts the inner surface of the aircraft fuselage at a second position between the front seal 22 and the rear seal 30, preferably between the rear seal 30 and the fixing point 32 of the supporting legs 19 to the ring 20. In this area, the carrier ring 20 possesses an annular hump 27 so that the outer surface 28 touches the ends 24 of the bridging strips 23. The preferred fabrication of the carrier ring 20 from composite material allows the teflon shoes 16 used in the known assembly as shown in FIG. 2 to be eliminated. Such shoes may nevertheless be used in the seal assembly in accordance with the invention without altering the concept of the assembly fitted with front 22 and rear 30 hollow seals.

The sliding movements at the second contact position are mainly axial.

The presently described embodiment is only one example of the implementation of the concept of a seal assembly in accordance with the invention, this being concerned with hollow front and rear seals capable, if necessary, of being retracted or deployed by controlled inflation.

ADVANTAGES

The number of parts of the seal assembly in accordance with the invention is equal to 2 + N; that is to say, a front seal, a carrier ring, and N rear seals (usually about 10).

Relative to the known mentallic seal assembly described with reference to FIG. 2, the seal assembly in accordance with the invention has a mass which is about twice as low, which constitutes a considerable advantage bearing in mind its use on an aircraft.

The number of parts and its design ensure that the composite seal assembly in accordance with the invention will be about four times cheaper than the known metallic seal assembly of FIG. 2.

Also, the seal assembly in accordance with the invention allows better checking and control of the displacements of the few constitutent parts, and the required sealing is thus improved.

I claim:

1. A sealing assembly for an aircraft including a fuselage and a turbojet engine disposed within said fuselage towards the rear end thereof, said engine having an afterburner duct and a nozzle including outer flaps adjacent said rear end of said fuselage, said sealing assembly being located between said rear end of said fuselage and said outer flaps of said nozzle, and support legs attach said sealing assembly to said afterburner duct, wherein said sealing assembly comprises:

a carrier ring having front and rear ends, a hollow front seal located at said front end of said carrier ring and engaging the inner surface of said fuselage at said rear end thereof at a first contact zone, said carrier ring also engaging said inner surface of said fuselage at said rear end thereof by simple frictional contact at a second contact zone separate from said first contact zone, and a hollow rear seal located at said rear end of said carrier ring and engaging said outer flaps at a third contact zone.

2. A sealing assembly in accordance with claim 1, wherein said carrier ring comprises a composite material and is substantially cylindrical.

3. A sealing assembly in accordance with claim 1, wherein said front seal comprises silicone.

4. A sealing assembly in accordance with claim 1, wherein said front seal is inflatable and retractable.

5. A sealing assembly in accordance with claim 1, wherein said rear seal comprises an extra flat inflatable seal.

6. A sealing assembly in accordance with claim 1, wherein said rear seal is divided into a plurality of parts equal to the number of said outer flaps, each separate part contacting a respective one of said outer flaps.

7. A sealing assembly in accordance with claim 1, wherein said carrier ring comprises a carbon-epoxy material.

8. A sealing assembly in accordance with claim 1, wherein said carrier ring comprises a material of a carbon-bis-maleimide type.

* * * * *